United States Patent
Schöpp et al.

(10) Patent No.: US 7,451,471 B1
(45) Date of Patent: Nov. 11, 2008

(54) LOCAL VIDEO AND AUDIO NETWORK WITH OPTICAL DATA LINE

(75) Inventors: Harald Schöpp, Ettlingen (DE); Erich A. Geiger, Kaempfelbach (DE); Detlef Teichner, Königsfeld (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 09/857,474

(22) PCT Filed: Dec. 15, 1999

(86) PCT No.: PCT/EP99/09954

§ 371 (c)(1),
(2), (4) Date: Sep. 10, 2001

(87) PCT Pub. No.: WO00/38429

PCT Pub. Date: Jun. 29, 2000

(30) Foreign Application Priority Data

Dec. 18, 1998 (DE) ................................. 198 58 493

(51) Int. Cl.
*H04N 7/18* (2006.01)
*H04N 7/173* (2006.01)

(52) U.S. Cl. .............................. 725/75; 725/80; 725/98; 725/118; 725/148

(58) Field of Classification Search .................. 725/75, 725/80, 98, 118, 148, 85, 109, 110, 131; 370/395, 503; 709/231, 232, 203, 217, 218, 709/219

See application file for complete search history.

(56) References Cited

U.S. PATENT DOCUMENTS

| 5,257,259 A | 10/1993 | Tsurumi | 370/60.1 |
| 5,552,921 A | 9/1996 | Hetzel et al. | 359/173 |

(Continued)

FOREIGN PATENT DOCUMENTS

| DE | 195 03 207 A1 | 8/1995 |
| EP | 0 658 010 A1 | 6/1995 |

OTHER PUBLICATIONS

"Automotive Communication and Information Networks-The D2B Optical Solution", C& C Electronics Ltd., Apr. 13, 1994.

*Primary Examiner*—Kieu-Oanh Bui
(74) *Attorney, Agent, or Firm*—O'Shea Getz P.C.

(57) ABSTRACT

An optical ring network for use, for example, in a motor vehicle, includes an optical data line that defines a ring network, a playback transducer and at least one data source connected to the optical data line, where the data source provides compressed data onto the optical data line. The network also includes at least one data sink connected to the optical data line, which receives the compressed data from the optical data line. The data sink includes a bit stream decoder that decompresses the received compressed data and provides the decompressed data to the playback transducer. The local network transmits audio and video data in compressed form via the data line, and has a single bit stream decoder, centrally situated at the respective data sink, for decompressing the audio and/or video data. As a result, the individual data sources no longer need their own bit stream decoder for decompressing the data. By the assignment of such a bit stream decoder centrally to the relevant data sink, the components of the individual subscribers are distributed in a more efficient manner within the network, which better utilizes the available data transmission capacity of the network, due also to the transmission of compressed data instead of decompressed data. Overall costs of the network are also reduced.

12 Claims, 1 Drawing Sheet

U.S. PATENT DOCUMENTS

| | | | |
|---|---|---|---|
| 5,856,975 A * | 1/1999 | Rostoker et al. | 370/395.64 |
| 5,872,784 A * | 2/1999 | Rostoker et al. | 370/395.64 |
| 5,959,658 A | 9/1999 | Gnauck et al. | 348/6 |
| 6,044,403 A * | 3/2000 | Gerszberg et al. | 709/225 |
| 6,212,198 B1 | 4/2001 | Heck et al. | 3/16 |
| 6,396,531 B1 * | 5/2002 | Gerszberg et al. | 348/14.01 |
| 6,404,941 B1 * | 6/2002 | Picard et al. | 385/18 |
| 6,611,537 B1 * | 8/2003 | Edens et al. | 370/203 |
| 6,782,552 B1 * | 8/2004 | Stiegler et al. | 725/74 |
| 6,865,188 B1 * | 3/2005 | Stirling et al. | 370/460 |

* cited by examiner

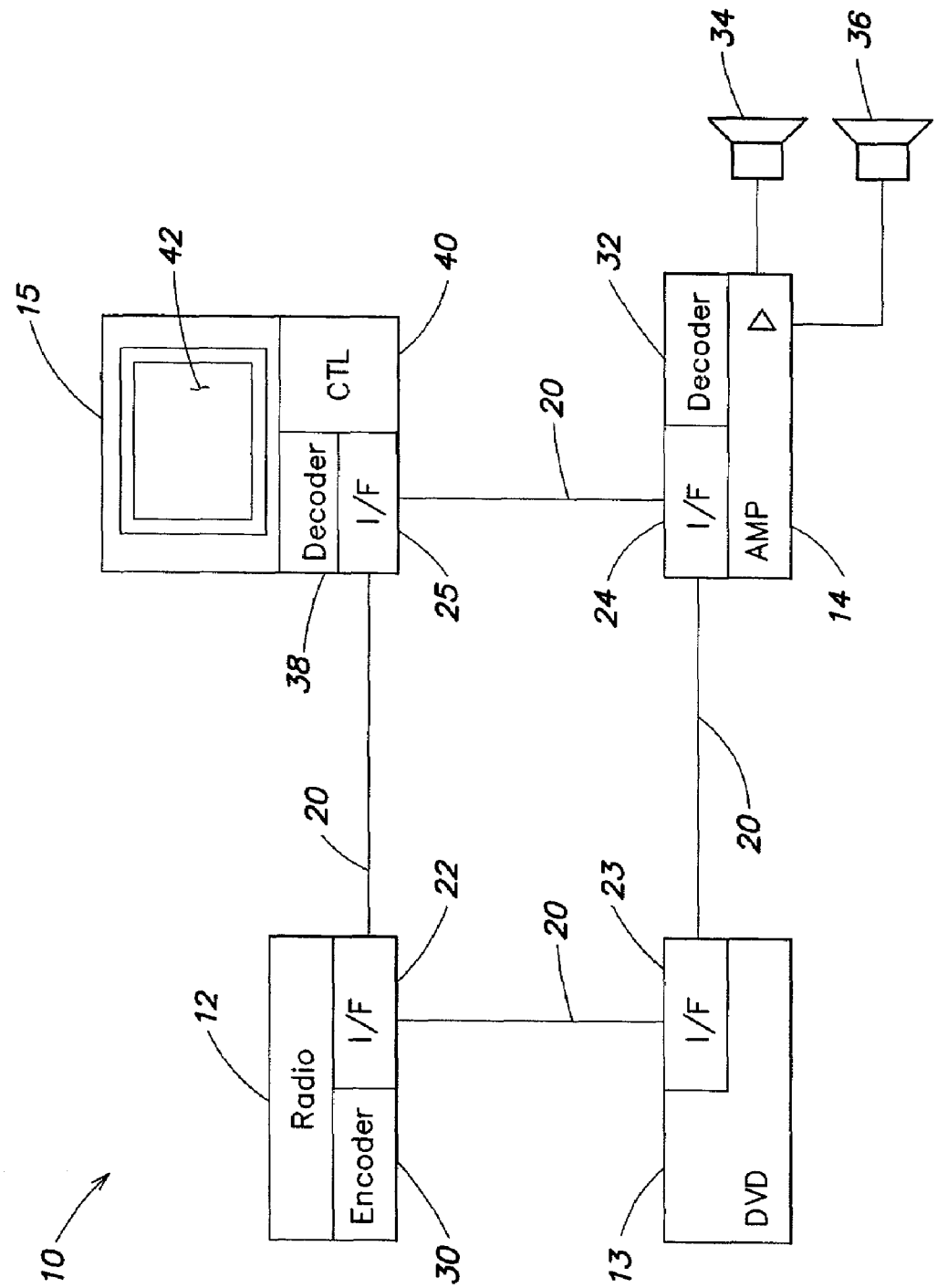

LOCAL VIDEO AND AUDIO NETWORK WITH OPTICAL DATA LINE

PRIORITY INFORMATION

This patent application claims priority to International patent application PCT/EP99/09954 filed Dec. 15, 1999 and German patent application 198 58 493.8 filed Dec. 18, 1998, which are hereby incorporated by reference.

BACKGROUND OF THE INVENTION

The invention relates in general to automotive multimedia systems, and in particular to an automotive multimedia system having a local network with several subscribers connected together into a ring network by an optical data line, to transmit and receive compressed data of various types.

Local networks with several subscribers connected together into a ring network by an optical data line, to transmit audio, video and/or control data are known, for example, from European Patent EP 519 111 B1. The local network disclosed therein has several subscribers, some of which generate audio or video data and control data, and provide the data into the ring network. The subscribers that generate such data are typically referred to as data sources. Other subscribers to the network receive the data intended for them from the network, and then present the data to a user, for example, by acoustic or visual reproduction. The subscribers that receive such data are often referred to as data sinks.

The known local networks have various data sources such as, for example, a car radio, CD player, DVD player, or a TV tuner, which typically transmit their data uncompressed over the optical data line to the appropriate data sink, for example a car amplifier to which several loudspeakers are connected, or a screen which displays the uncompressed FBAS video signal. The subscribers to such a network input their data to the network independently of one another and thus sometimes simultaneously, and withdraw the data in the same manner. Consequently, such a network can accommodate only a few subscribers at any one time since the transmission capacity of the network over the data line is inherently limited.

Individual devices are known, for example a television having a TV tuner and picture tube in a housing, and which are connected to one another via a data line. Uncompressed video signals are transmitted through the data line (e.g., as FBAS signals), and are displayed on the picture tube. Device combinations are also known, for example a DVD player with a television set. With this combination, the compressed data stored on the digital video disk (DVD), which are coded, for example according to the MPEG-2 standard, are read and decoded and decompressed by an appropriate MPEG-2 decoder in the DVD player. The decompressed data are then transmitted over the connecting data lines to the television set which reproduces and displays these decompressed data, for example as an FBAS signal, in accordance with the video data received by the TV tuner. A problem with the prior art systems is that the data on the data network are not compressed and thus make inefficient use of the bandwidth of the data line, and further require the data sources to provide decompressed data to the data sinks.

What is needed is a data network that connects several devices together and transmits and receives compressed data over the network.

SUMMARY OF THE INVENTION

An optical ring network for use, for example, in a motor vehicle, includes an optical data line that defines a ring network, a playback transducer and at least one data source connected to the optical data line, where the data source provides compressed data onto the optical data line. The network also includes at least one data sink that is connected to the optical data line, and receives the compressed data from the optical data line. The data sink includes a bit stream decoder that decompresses the received compressed data and provides the decompressed data to the playback transducer.

The local network transmits audio and video data in compressed form via the data line, and has a single bit stream decoder, centrally situated at the respective data sink, for decompressing the audio and video data. This makes it possible to dispense with the prior art decoders located at the various data sources, for example the bit stream decoder in the DVD player. For example, if several such data sources are arranged in a network, it is now possible to dispense with the requisite bit stream decoder in each of the individual data sources as in the prior art. This reduces the attendant costs of the network. In the local network of this aspect of the invention, a single bit stream decoder is required for decompressing the corresponding video data or audio data. As a result, the individual data sources no longer need their own bit stream decoder for decompressing the data. By the assignment of such a bit stream decoder centrally to the relevant data sink, the components of the individual subscribers are distributed in a more efficient manner within the network. Advantageously, this better utilizes the available data transmission capacity of the network, due to the transmission of compressed data instead of decompressed data. It also reduces the overall costs of the network. The various data sources can be implemented more economically at the expense of the data sinks, since the data sources can dispense with the relatively cost-intensive bit stream decoders. Further, since a local network typically has a larger number of data sources than data sinks, this facilitates the cost reductions.

In one embodiment, the data sink with its bit stream decoder is separate from the data sources, and the compressed audio or video data are conducted to the data sink via the optical data line. This reduces the circuit complexity of the data sink, further reducing the costs of the network. This also allows for the compressed data conducted to the data sink to be treated equally, and that no parallel input audio or video data are treated preferentially.

The data connection between the data sources and the data sink with the bit stream decoder can be controlled by control data transmitted over the data line. This allows for the reliable establishment of the data connections, the assignment of the data sink to the data sources, as well as control of the type of decompression. The bit stream decoder may be switched between several modes of decoding by the transmitted control data. This allows a single bit stream decoder to read several compressed data formats, and an appropriate switched state of the bit stream decoder can be chosen as needed (i.e., depending on the compressed data format used by the data source). The decoder may support video data compression formats such as MPEG-1, MPEG-2, and JPEG. Another bit stream decoder can be switched to decompress various audio compression formats (e.g., AC-3, MPEG-1, and MPEG-2). This can further reduce the number of required bit stream decoders. It has proven beneficial to dispense with a collection of decoders for different types of compressed audio and video data, since the compression methods used therein as well as the data structures for the audio and video data differ widely. Also, the audio and video bit stream decoders can be collected together with relatively sophisticated organization and cost, which cancels the theoretical cost advantage of further decoder reduction.

These and other objects, features and advantages of the present invention will become more apparent in light of the following detailed description of preferred embodiments thereof, as illustrated in the accompanying drawing.

BRIEF DESCRIPTION OF THE DRAWING

The FIGURE is a block diagram illustration of a local video and audio network with an optical data line.

DETAILED DESCRIPTION OF THE INVENTION

A local network 10 includes a plurality of subscribers 12-15 that may be connected to one another in a ring by an optical data line 20. Each of the subscribers 12-15 includes an associated interface 22-25, respectively, and each interface 22-25 includes two connections to the optical data line 20 to establish the ring.

The subscriber 12 may be a car radio that forms a data source. As such, the radio 12 receives a radio signal and delivers the received signal as uncompressed audio data via its interface 22 to the data line 20 and thus to the network 10 for transmission to the associated data sink. Alternatively, the audio signals of the radio program may be conducted to an integrated bit stream encoder 30, which converts the audio signals into compressed audio data and transmits the signals, via the interface 22, to the optical data line 20. The AC-3 format is a suitable coding format for the audio signals.

Along with the audio data from the car radio 12, control data are also transmitted over the optical data line 20, which ensures the correct assignment of the audio data to the correct data sink (e.g., the subscriber 14 which may be an amplifier). In addition, an appropriate control signal ensures that the data sink 14 conducts the incoming data, inasmuch as these are transmitted as AC-3 compressed data to the corresponding AC-3 bit stream decoder 32, which decompresses the data. If the audio data transmitted by the car radio 12 to the data sink 14 are not compressed, the bit stream decoder 32 will typically not need to be activated to decompress the audio data.

The data sink 14 may contain an audio amplifier, which is connected via the interface 24 to the optical data line 20, to obtain the audio data directed to it. Depending on the control data transmitted with the audio data, the audio data may also be processed in the amplifier 14. For example, this processing may include equalization, application of a delay, or signal amplification, which are enabled/disabled by the control signals transmitted over the network 10. In the present example, the audio data compressed in the AC-3 format may be transmitted by the car radio 12 via the optical data line 20 through the subscriber 13 to the amplifier 14, where the audio data are decoded and decompressed by the AC-3 bit stream decoder 32. Subsequently, the audio data may be amplified and provided to a pair of loudspeakers 34, 36 connected to the amplifier 14.

In addition to the car radio 12, the local network 10 may include the second data source 14 such as a DVD player. The DVD player 13 may read from a DVD both audio and video data in compressed form, and may output the compressed audio and video data onto the data line 20 via its associated interface 23. The DVD player 13 can thus dispense with any kind of bit stream decoder because the audio and video data may be transmitted in compressed form over the data line 20 and an appropriate decoder may be situated centrally in the data sinks 14, 15 to play back the audio and video data. Thus, the DVD player 13 can dispense with the expensive integrated circuits to decode the audio data. In the network 10, the audio data are present, for example, in the AC-3 format while the video data are present, for example, as MPEG-2 data. This results in reduced cost for the DVD player 13.

The compressed audio and video data from the DVD player 13 may be sent to the appropriate data sinks, which may include the amplifier 13 described above and the display screen unit 15. In this configuration of the network 10, only the display screen unit 15 is considered as a data sink for the video data. The display screen unit 15 includes the interface 25 that connects the unit 15 to the data line 20. The unit 15 may also include an MPEG-2 decoder 38 that decodes and thus decompresses the MPEG-2 coded video data transmitted to the display screen unit 15. The decoder 38 may also, for example, make the data available as uncompressed RGB signals to the display unit 15 (e.g., a TFT) for playing back the video data. The display screen unit 15 may also include a control unit 40 that controls the display screen unit 15 by controlling the video data reproduction on a visual display screen 42 (e.g., its brightness, contrast, and hue). The control unit 40 may also adapt the function of the bit stream decoder 38 to the format of the input video data. In this way, the bit stream decoder 38 can either be turned off if non-coded video data are transmitted, or an appropriate decoding function of the bit stream decoder can be chosen, in accordance with the incoming format (e.g., MPEG-1, MPEG-2, or the JPEG format). For example, MPEG-2 decoders can readily function as MPEG-1 decoders.

The control unit 40 can not only control the display screen unit 15, but can also control the local network 10 and particularly the data channels for transmitting the audio and/or video data between the particular data sources and data sink.

Depending on the control unit 40, the compressed audio data from the DVD player 13 may be conducted via the optical data line 20 to the amplifier 14 or to the display screen unit 15, which may have loudspeakers integrated into the display screen unit housing. By way of example, the control unit 40 may set an acoustic playback of the audio data through the amplifier unit 14. In this case, the compressed audio data are received via the optical data line 20 by the interface 24 of the amplifier 14, and are conducted to the AC-3 bit stream decoder 32, which decodes and decompresses the compressed audio data and then conducts the uncompressed audio data to an amplifier stage of the amplifier 14. After the audio signals have been amplified, they are provided to the loudspeakers 34, 36.

The local network 10 therefore demonstrates how the data sources 12, 13 no longer each require a bit stream decoder, and how the bit stream decoders 32, 38 are assigned to the data sinks 14, 15 which are centrally responsible for playing back the audio or video data. The example of the amplifier 14 illustrates that it includes the AC-3 decoder 32 to decode the compressed audio data from the DVD player 13 and also from the car radio 12, and that these decoded audio data subsequently are reproduced by the loudspeakers 34,36. Through this centralization and assignment of the bit stream decoders 32, 38 to the corresponding data sinks 14, 15, the number of decoders can be reduced. On the one hand, this noticeably reduces the costs of such a network 10 even with a small number of subscribers 12-15. With a large number of subscribers, especially with an increasing number of data sources 12, 13, the achievable cost advantage becomes continuously greater.

Furthermore, the local network 10 exhibits the possibility of more efficiently utilizing the transmission capacity of the optical data line 20, since now more parallel data channels can be transmitted simultaneously. Through this combination of improving the transmission efficiency together with cost reduction, an advantageous local network 10 can be created.

Such a network 10 is especially suited for use in an automobile, since in this application electromagnetic compatibility (e.g., the optical data line 20), ease of installation (e.g., a single data line 20), and relatively low costs (e.g., reduction of the necessary bit stream decoders) with the same or greater functionality of the network 10 are achievable. This increased functionality becomes noticeable with the simultaneous transmission of several video data channels, since these channels typically have relatively large data quantities. It should also be noted that video applications are becoming increasingly important in automobiles, and consequently transmission efficiency together with adequate reliability for automotive use become of consideration.

Although the present invention has been illustrated and described with respect to several preferred embodiments thereof, various changes, omissions and additions to the form and detail thereof, may be made therein, without departing from the spirit and scope of the invention.

What is claimed is:

1. A motor vehicle optical ring network, comprising:
   an optical data line configured in a ring network and having a plurality of data channels;
   a plurality of data sources each connected to the optical data line, where each of the plurality of data sources provides compressed multimedia data onto the optical data line and each of the plurality of data sources is free of decoders that provide decompressed multimedia data onto the optical data line; and
   at least one data sink connected to the optical data line and comprising a video display device, and that receives the compressed multimedia data from the optical data line, where the data sink includes a bit stream decoder to decompress the received compressed multimedia data and provide (i) a decompressed video data signal indicative thereof to the video display device and (ii) a decompressed audio signal;
   where the at least one data sink also includes a control unit that selectively adapts the decompression of the received compressed multimedia data by the bit stream decoder based upon the compression format of the received compressed multimedia data, where the format of the received compressed multimedia data may be one of a plurality of compression formats, where the control unit also controls the data channels of the optical data line for transmitting the compressed data between the data sources and the data sink.

2. The motor vehicle optical ring network of claim 1, where the bit stream decoder includes an MPEG decoder, a JPEG decoder and an AC-3 decoder.

3. The motor vehicle optical ring network of claim 1, where the at least one data source comprises a DVD player connected to the optical data line and provides the compressed multimedia data onto the optical data line.

4. The motor vehicle optical ring network of claim 3, where the bit stream decoder is selectively configured as one of an MPEG decoder and an AC-3 decoder in response to control signal data received by the bit stream decoder over the optical data line.

5. The motor vehicle optical ring network of claim 1, further comprising a second data source including a radio receiver that provides compressed audio data onto the optical data line.

6. An optical ring network for a motor vehicle multimedia system, comprising:
   an optical data line configured as a ring network and having a plurality of data channels;
   a first data source comprising a radio receiver, which is connected to the optical data line, and provides compressed audio data onto the optical data line;
   a second data source that is connected to the optical data line, and provides compressed multimedia data onto the optical data line, where each of the first and second data sources is free of decoders that provide decompressed multimedia data onto the optical data line; and
   at least one data sink that includes a video display device and is connected to the optical data line, and that receives the compressed multimedia data, where the at least one data sink includes a bit stream decoder to decompress the received compressed multimedia data and provide (i) a decompressed video data signal indicative thereof for display by the video display device, and (ii) a decompressed audio signal to a loudspeaker, and where the at least one data sink includes a control unit that selectively adapts the decompression of the received compressed multimedia data to a format of the received compressed multimedia data, where the format of the received compressed multimedia data includes one of a plurality of compression formats, where the control unit also controls the data channels of the optical data line for transmitting the compressed data between the data sources and the data sink.

7. The optical ring network of claim 6, where the bit stream decoder decodes MPEG and AC-3 data.

8. The optical ring network of claim 6, where the first bit stream decoder decodes MPEG and JPEG data.

9. The optical ring network of claim 6, where the second data source includes a digital video disc (DVD) player.

10. A motor vehicle network, comprising:
    a ring network having a plurality of data channels;
    a first one data source connected within the ring network, and provides compressed multimedia data within the ring network;
    a second data source connected within the ring network, where the second data source comprises a radio receiver that provides a received radio signal to an encoder that provides compressed audio data indicative thereof within the ring network, where each of the first and second data sources is free of decoders that provide decompressed multimedia data onto the ring network;
    a first data sink comprising a video display device and connected within the ring network, and that receives the compressed multimedia data from within the ring network, where the first data sink includes a bit stream decoder to decompress the received compressed multimedia data and provide corresponding decompressed video data to the video display device; and
    a second data sink connected within the ring network, and which receives the compressed audio data and provides decompressed audio data indicative thereof;
    where the first data sink includes a control unit that selectively adapts the decompression of the received compressed multimedia data by the bit stream decoder based upon the compression format of the received compressed multimedia data, and the control unit also controls the data channels of the ring network for transmitting the compressed data between the data sources and the data sink.

11. The motor vehicle network of claim 10, further comprising a loudspeaker that receives the decompressed audio data.

12. The motor vehicle network of claim 10, where the bit stream decoder comprises an MPEG decoder.

* * * * *